United States Patent
Miller et al.

(10) Patent No.: US 8,097,185 B2
(45) Date of Patent: Jan. 17, 2012

(54) MAGNETIC ACTIVATED CARBON PARTICLES FOR ADSORPTION OF SOLUTES FROM SOLUTION

(75) Inventors: Jan D. Miller, Salt Lake City, UT (US); Gustavo A. Munoz, Salt Lake City, UT (US); Saskia Duyvesteyn, Holladay, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 1842 days.

(21) Appl. No.: 10/468,882

(22) PCT Filed: Feb. 26, 2002

(86) PCT No.: PCT/US02/06065
§ 371 (c)(1),
(2), (4) Date: Mar. 25, 2004

(87) PCT Pub. No.: WO02/069351
PCT Pub. Date: Sep. 6, 2002

(65) Prior Publication Data
US 2004/0147397 A1 Jul. 29, 2004

Related U.S. Application Data

(60) Provisional application No. 60/271,551, filed on Feb. 26, 2001.

(51) Int. Cl.
*H01B 1/04* (2006.01)
*C02F 1/48* (2006.01)
*C04B 35/26* (2006.01)
*B03C 1/00* (2006.01)

(52) U.S. Cl. .................. 252/506; 210/695; 252/62.56
(58) Field of Classification Search .............. 252/503, 252/506, 62.55, 62.56; 423/25; 210/222, 210/504, 679, 695
See application file for complete search history.

(56) References Cited

U.S. PATENT DOCUMENTS
3,803,033 A * 4/1974 Sutherland .................. 210/673
(Continued)

FOREIGN PATENT DOCUMENTS
GB 1 568 349 5/1980
(Continued)

OTHER PUBLICATIONS

Herkenhoff, Earl, et al.; Magchar: An Alternative for Gold Plants Using Carbon-In-Pulp Systems; ESMJ; Aug. 1982, 4 pages.

*Primary Examiner* — Mark Kopec
(74) *Attorney, Agent, or Firm* — Thorpe North & Western LLP

(57) ABSTRACT

A composition of and method for forming activated carbon with magnetic properties for magnetic separation of the activated carbon from a liquid being treated is disclosed wherein a solution iron magnetic precursor is intimately mixed or absorbed into a porous carbon precursor or mixed with a solution or meltable carbon precursor to form an essentially homogeneous mixture or solution that when dried and pyrolized forms activated carbon particles with magnetic material evenly dispersed throughout the activated carbon material. The activated carbon particles may be of fine particle size, even powdered, and still retain magnetic properties sufficient for magnetic separation. In a particular aspect of the invention, a carbon precursor of soft wood is soaked in a solution of a ferric salt, dried, pyrolized and activated.

20 Claims, 19 Drawing Sheets

U.S. PATENT DOCUMENTS

| | | | |
|---|---|---|---|
| 4,201,831 A * | 5/1980 | Slusarczuk et al. | 252/62.53 |
| 4,284,511 A | 8/1981 | Weitzen et al. | |
| 5,705,195 A * | 1/1998 | Volkonsky et al. | 424/490 |
| 6,194,344 B1 | 2/2001 | Tsuchitani et al. | |
| 2007/0274907 A1* | 11/2007 | Li et al. | 424/1.11 |
| 2009/0220767 A1* | 9/2009 | Schlogl et al. | 428/323 |
| 2010/0155335 A1* | 6/2010 | Taboada-Serrano et al. | 210/663 |

FOREIGN PATENT DOCUMENTS

JP     2001-300507     10/2001

* cited by examiner

Carbonization results for P0-1

MAGNETIC ACTIVATED CARBON PARTICLES FOR ADSORPTION OF SOLUTES FROM SOLUTION

RELATED APPLICATIONS

This application is filed under 35 U.S.C. 371 from International Application filed under the Patent Cooperation Treaty Application PCT/US02/06065, filed 26 Feb. 2002. Priority is claimed from U.S. Provisional Patent Application 60/271,551, filed 26 Feb. 2001.

FIELD OF THE INVENTION

This invention relates to activated carbon with magnetic properties.

BACKGROUND OF THE INVENTION

Activated carbon is used to remove any number of materials from liquids and gasses, for recovery of values or for the purification of a wide range of substances. It is used in the water, food, mining, automotive, chemicals, pharmaceutical and environmental industries. A common application of activated carbon is to adsorb ions, complexes and molecules from aqueous solutions, and the like. Accordingly, activated carbon has been used to extract dissolved metals, either to purify the water, and/or to recover valuable metallic values.

In particular, in water treatment applications, activated carbon is commonly used for removing organic molecules and heavy metals. Water is commonly adulterated with pollutants from industrial activity, runoff from polluted sites, and from various other sources. These pollutants, which can range from various organic molecules and heavy metals must be removed to render the water safe and to comply with environmental regulations. This is often accomplished by contacting the polluted water with activated carbon. The treated water and the activated carbon are then separated, and the activated carbon is treated to dispose of the pollutants. The water is often contacted with the carbon by passing the water through fixed beds of the carbon. However, some operational efficiencies may be derived by mixing the water and carbon in, for example, a stirred tank. However, this requires separation by mechanical screening, or the like, to separate the carbon particles from the treated water.

Another common application of activated carbon is to extract gold complexes from gold leach solutions. Gold leaching in alkaline cyanide solutions has been studied extensively for more than 200 years, and it has been applied successfully at the industrial level for more than a century. The high recoveries, economics and simplicity of the process have made cyanide leaching the preferred route for gold dissolution from its ores. Conventional gold recovery methods involve crushing and grinding of the gold ores followed by dissolution of the gold in an oxygenated alkaline cyanide solution. Gold, dissolved as the $Au(CN)_2^-$ complex, is recovered from solution by several methods, adsorption on activated carbons (carbon-in-pulp, carbon-in-leach and carbon-in-column processes) being a preferred method. The United States mined 340 metric tons of gold during 1998, of which 78% were recovered by the use of activated carbon. The remaining 22% was recovered by other methods. After separation of the activated carbon from the pulp or solution, the adsorbed $Au(CN)_2^-$ complex is stripped off the activated carbon for subsequent precipitation and refining.

Activated carbons are used for gold recovery from solutions due to their high capacity for adsorption. The adsorptive properties of activated carbon are a consequence of the highly developed micropore structure and of the surface functional groups generated during the production process. Gold adsorption onto activated carbon is a diffusion-controlled process, where the size of the carbon particles plays an important role. In general, gold adsorption capacity and gold adsorption kinetics increase as the size of the activated carbon particles decrease. In spite of the advantages that fine activated carbon particles offers in terms of adsorption capacity and adsorption kinetics, conventional carbon-recovery gold circuits use granular activated carbon particles that are significantly coarser than the ground ore, in order to produce an effective separation of the gold-loaded activated carbon from the slurry phase by mechanical screening. Mechanical screening is the simplest method of separation of solids, and it is based solely on the difference in particle sizes.

Separation of activated carbon from the slurry phase by screening has significant problems. The screens may blind and break due to excessive wear, require considerable horsepower to operate, and need frequent maintenance and screen replacement. Also, gold loaded onto the exposed carbon may be lost by abrasion. Losses of activated carbon due to these factors could be as high as 50 grams of carbon per metric ton of ore, and cumulative losses of fine activated carbon within a year of operation can be as high as 20%. This represents significant amounts of gold adsorbed to activated carbon that is unrecoverable by screening. Fine powdered activated carbon shows a significant increase in gold adsorption kinetics and gold adsorption capacity due to a more extended external surface area. However, powdered activated carbon currently cannot be used in gold recovery circuits, since both the carbon and the solids in suspension will have particle sizes of the same magnitude, thus, separation of the gold-loaded activated carbon from the slurry phase by screening, filtration, or sedimentation are not viable options.

In general, a method to separate activated carbon particles from a liquid solution that avoids the problems of mechanical screening would be desirable. Since screening depends upon the particles having a relatively large size, abrasion or other unintended comminution, produces small particles which defeats the screening. An alternative to screening would be magnetic separation, using a magnetic activated carbon. Magnetic carbons have been made by mixing or coating carbon or a carbon precursor with a magnetic material, usually with magnetite, and treating to activate or transform the carbon or carbon precursor. A problem with these materials is that the magnetic material is widely dispersed in the carbon particle or upon its surface. This is inherent in these compositions, since powdered magnetic material (magnetite) is used and in only a minor amount to impart the magnetic property. Thus, depending on the particular composition, the magnetic material is dispersed throughout a matrix as small particles of the carbon material, or concentrated upon the surface. When these materials are abraded or comminuted, carbon fines are usually formed that are free the magnetic material and cannot be magnetically separated. Thus, magnetic separation requires that the particles be relatively large to maintain their magnetic properties. Accordingly, the non-magnetic fines formed cannot be recovered. Thus, the recovery requires relatively large carbon particles, the same as in mechanical screening, and fine carbon particles cannot be recovered.

Additionally, the abrasion of the prior-art magnetic activated carbon materials also frees the magnetic material. This magnetic material must then be removed by screening. However, unfortunately, this screening also separates the abraded non-magnetic carbon fines with the freed magnetic particles, both of which are then lost.

Another problem with some magnetic carbon compositions, is that their magnetic properties are not sufficiently "soft." It is desired that the carbon become magnetic only during exposure to the magnetic field used to separate the carbon particles from the solution. Any residual or "hard" magnetism that remains only complicates the separation process since the carbon particles stick together and stick to and foul the process machinery.

There is a need in the art for a magnetic activated carbon that has soft magnetic properties, where the magnetic property is essentially homogeneously dispersed or intimately mixed throughout the activated carbon so that even small carbon fines retain the magnetic property. This would allow recovery of the carbon, independent of the particle size and totally eliminate the need for screening. Smaller activated carbon particles (even powdered) could then be used to exploit kinetic and adsorption capacity advantages of small particles.

SUMMARY OF THE PRIOR-ART

U.S. Pat. No. 2,479,930 discloses a process of precious metals recovery from ores using a magnetic activated carbon that can be recovered from solution using a magnetic separator.

U.S. Pat. No. 4,260,523 discloses a method for forming a magnetized active carbon composition that consists essentially of mixing 100 parts of active carbon and 5-100 parts by weight of a magnetized ferromagnetic material, and compressing the mixture to form pellets. The ferromagnetic material has been previously subjected to a saturation magnetization treatment by application of a magnetic treatment prior to preparation of the mixture and the ferromagnetic material. Since these materials retain their magnetism after being subjected to saturation magnetism, they clearly have hard magnetism, which is not desired in separation and purification applications.

U.S. Pat. No. 4,201,831 describes a physical mixture of a magnetic particulate material and an organic material that will decompose into "elemental" carbon, to produce a magnetic adsorbent composite.

The above patents all disclose magnetic carbons formed from mixtures including magnetic materials. As discussed above, these compositions require that the carbon particles retain a relatively large size to insure that the magnetic property is retained in the particle. For the activated carbon materials used in a solution, such as in U.S. Pat. Nos. 2,479,930 and 4,201,831, the handling of the carbon produces carbon fines, as the particles are abraded. These carbon fines usually have not retained any of the magnetic material and cannot be separated by a magnetic field. This results in the loss of the carbon and any material that was adsorbed upon the carbon.

BRIEF SUMMARY OF THE INVENTION

The present invention provides a magnetic carbon wherein magnetic material is intimately or essentially homogeneously dispersed through the carbon particles such that even small carbon fines are magnetic. The magnetic carbon of the invention has a soft magnetic property, and is a fine particle size magnetic activated carbon that has improved kinetic properties and adsorbs larger amounts of material per unit mass of carbon.

The present invention is a composition and process wherein magnetic material is intimately and essentially homogeneously mixed or combined with an activated carbon material. This allows a magnetic property to be retained even in small powder particles and allows magnetic separation for these small particles. The process of the invention involves the intimate mixing or combining of a carbon precursor and a magnetic material precursor. The carbon precursor is contacted in a manner to form a blend of the carbon precursor and the magnetic material precursor where the carbon precursor and the magnetic material precursor are intimately mixed and integrated together. The carbon precursor and the magnetic material precursor can be integrated together by any suitable method.

A preferred embodiment of the invention is where a magnetic precursor in solution is mixed with an organic material, and during the pyrolysis (carbonization) treatment, the ferromagnetic material is formed. In this method the carbon precursor is a porous material that readily absorbs a solution of the magnetic material precursor. The porous carbon precursor is soaked in the solution for sufficient time to integrate enough magnetic material precursor into the porous material so that when the porous material is dried, carbonized and activated it has sufficient magnetic property to permit magnetic separation. The exact magnetization for separation is dependent upon several variables, including exact size, size distribution and composition of the carbon particles, and is within the skill of a practitioner to determine.

Suitable porous materials include agricultural wastes that are soft and porous and allow easy impregnation of the magnetic precursor solution. These include pinewood sawdust and shavings, byproducts of lumber mills, sugar cane baggasse, a byproduct of cane sugar manufacturing, and lignin from softwoods, a byproduct of paper manufacturing. Other porous materials, such as porous plastic foams or water swellable plastic materials may also be suitable if they are capable of absorbing sufficient solution.

The carbon precursor may also be a carbon containing material that melts and becomes liquid and allows mixture with the magnetic material precursor. The carbon precursor must melt sufficient to allow an intimate mixture of the magnetic material and the carbon material in the final product. Suitable materials include sugars and molasses that are byproducts of sugar manufacturing, and low melting, low density plastics.

The carbon-precursor may also be a material that is soluble in water, thus dissolving in the solution of the magnetic material precursor. Such materials include sugars, molasses and other soluble carbohydrates that are byproducts of the food and paper manufacturing industries. Also suitable are water-soluble plastic materials.

The magnetic precursor may be any suitable compound that contains iron in any suitable form, which may be, but not limited to ferric iron, ferrous iron, or elemental iron. Suitable magnetic precursors include, for example, compounds that are soluble in water to form iron ions in solution. These include, but are not limited to ferric and ferrous salts, such as ferrous chloride, ferric chloride, ferric nitrate, ferrous sulphate, ferric sulphate, and ferric citrate. These soluble compounds can be dissolved to form a solution and used to soak the carbon material precursor. In this manner it is integrated into porous carbon material precursors by the soaking the carbon precursor in the solution of the soluble compound. Also suitable are solid or liquid iron materials that can be melted together with the carbon precursor material (such as a plastic or a starch) to form a homogeneous solid mixture or solution. Examples of solid iron materials are iron oxides (such as hematite ($Fe_2O_3$) and magnetite ($Fe_3O_4$)), ferrous acetate, ferrous oxalate, or the iron salts listed before (ferrous chloride, ferric chloride, ferric nitrate, ferrous sulphate, ferric sulphate, and ferric citrate). An example of a liquid iron source is iron pentacarbonyl. A homogeneous mixture can also be formed using a water-soluble magnetic material and a water-soluble carbon precursor and dissolving both into homogeneous solution. The requirement is that a homogeneous solution or molten mixture of the magnetic material precursor and the carbon material precursor be formed.

The magnetic activated carbon particles of the invention comprise a magnetic activated carbon with the ferromagnetic material nanometrically dispersed throughout the carbon. The dispersion is essentially on a molecular level. The product has a low remanent magnetization, so the application of a saturation magnetization treatment is unnecessary.

The small particle size of the magnetic activated carbon results in higher loading capacity of the adsorbed material and faster adsorption kinetics than prior-art activated carbon that cannot be manufactured with such a small size.

In the prior art applications involving the treatment of aqueous solutions the particle size smallest size that has been produced for magnetic separation is near 150 μm. For the present invention, particle sizes can be much smaller. A particle size between about 50 μm and 110 μm has been found suitable for magnetic separation, but particles sizes well outside of this range may be suitable depending upon the application. This size is generally included in the range considered powdered. Smaller sized particles are expected to be subject to magnetic separation, but smaller sizes become difficult to work with in industrial applications, and are not preferred. In current studies of the invention, a particle size between 53 and 106 μm has been used, as well as a particle size range of 150-600 microns.

In gold extraction the present invention will result in higher gold loading capacity and faster gold adsorption kinetics than that of the traditional activated carbon currently used in industry. It is expected that the magnetic properties of the activated carbon will permit gold-loaded activated carbon recovery from slurry by any suitable magnetic separation method, such as a wet high intensity magnetic separator or magnetic drum separator, instead of the current screening process.

For water purification applications, practice of the present invention will introduce more flexibility in how the activated carbon is contacted with the water, allowing mixed systems, instead of fixed bed systems, and dramatically reduce the amount of activated carbon required to achieve the desired purification. Separation of the activated carbon from the water can be achieved by known magnetic separation technologies.

In summary, the advantages of the present invention derive from the reality first, the very small particle size of the magnetic activated carbons results in higher adsorption kinetics than that of conventional granular activated carbon. Second, because the activated carbon is magnetic, it can easily be separated from streams to which it has been added, even from those that contain solids. Such improvements are expected to have significant economic impact on plant design and operation.

Studies to date have indicated that the adsorption properties of the carbon are not affected by the presence of the magnetic material. Thus, the advantages achieved by the smaller particle size are not diminished by the magnetic material.

The improved adsorption capacity and kinetics can also result in further advantages. Generally, during the process of adsorbing material from the solution, the concentration of the material in solution will be reduced much quicker, and in a continuous process the concentration will typically be much lower. Based on chemical principles, this will alter the equilibrium and the driving forces for reactions involving the adsorbed material. In gold extraction using cyanide solutions, it is expected that the driving force from gold to the formation of the dissolved gold-cyanide complex will be increased. This in turn leads to further process efficiencies, such as lower reactor size, and lower cyanide requirements.

The magnetic activated carbon particles of the invention may be used in any application where activated carbon is required and where separation of the activated carbon is required. These include any application where liquids are treated with activated carbon and the carbon is then separated from the liquid. The magnetic activated carbon may also be used in gas treatment applications where separations of the carbon from another process material, such as another particulate adsorbent or catalyst, are required. Separation is then accomplished by magnetic separation. Since small particle (powdered) particles can be separated, the choice of particle size of the activated carbon is as dependent upon the magnetic separation process, which allows greater flexibility in optimizing the size for adsorption or other properties.

DETAILED DESCRIPTION OF THE INVENTION

Synthesis of Powdered Magnetic Activated Carbon (MAC)
Raw Materials and Equipment:

The carbon source for MAC preparation is a softwood with low density (pinewood), and the magnetic precursor for MAC preparation is an iron salt ($FeCl_3$). Wood shavings were produced in a lumber mill using a bark-free pinewood lumber. Subsequently, the shavings were ground in a micro hammer mill to a particle size of 18×30 mesh (600-1000 μm).

MAC composition and structure were analyzed with a Rigaku DMAX 2200V X-ray diffractometer (XRD). Gold adsorption characteristics were analyzed by solution depletion in a Perkin Elmer 400 inductively coupled plasma emission spectrometer (ICP). Magnetic parameters, such as magnetic susceptibility, coercivity, magnetic remanence and hysteresis behavior, were analyzed in a LakeShore 735 Vibrating Sample Magnetometer.

Impregnation:

200 g of pinewood, ground to a particle size of 18×30 mesh (600-1000 μm) were immersed in 1.5 L of a solution containing 2.5, 5 and 10 g $Fe^{3+}$/L as $FeCl_3$. The pulp was shaken in a 2-L plastic bottle using a VWR orbital shaker at 200 rpm for 24 hr. The solution was removed from the solid wood by vacuum filtration using Wathman® paper No. 1. The solid residue was then dried in an oven at 333° K (60° C.) for 48 hr.

Pyrolysis Atmosphere:

A tube furnace was purged with $N_2$ for 30 minutes before heating was performed. The $N_2$ flow was fixed at $6\times10^{-2}$ moles/min, or 1.56 L/min calculated at 273.15° K (0° C.) and 1 atm (STP).

Pyrolysis Rate and Temperature:

The raw material was placed in a tube furnace at 300° K (27° C.), and the temperature was raised to 900° K (627° C.) at a heating rate of 12° K/min. The pyrolyzed material was kept at that temperature to achieve 60 minutes of total heat treatment. The pyrolyzed material was then transferred to another tube where it was cooled down to room temperature at a rate of 60° K/min under a fixed $N_2$ flow of 1.56 L/min calculated at STP.

Figure 1:
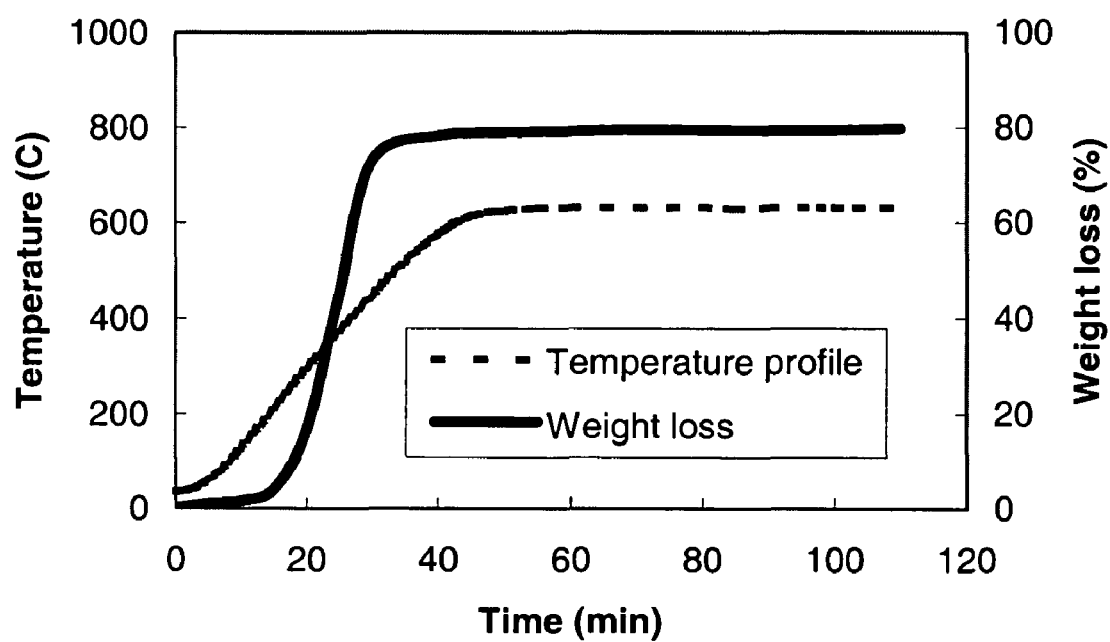
FIG. 1 is a graph showing weight loss and temperature profile during carbonization of an 18×30 mesh pinewood sample with no iron impregnation.

The temperature of 900° K was selected for wood pyrolysis based on published data and on experimental tests. FIG. 1 shows the weigh loss due to carbonization and temperature profile for a pinewood sample without iron impregnation.

Figure 2:
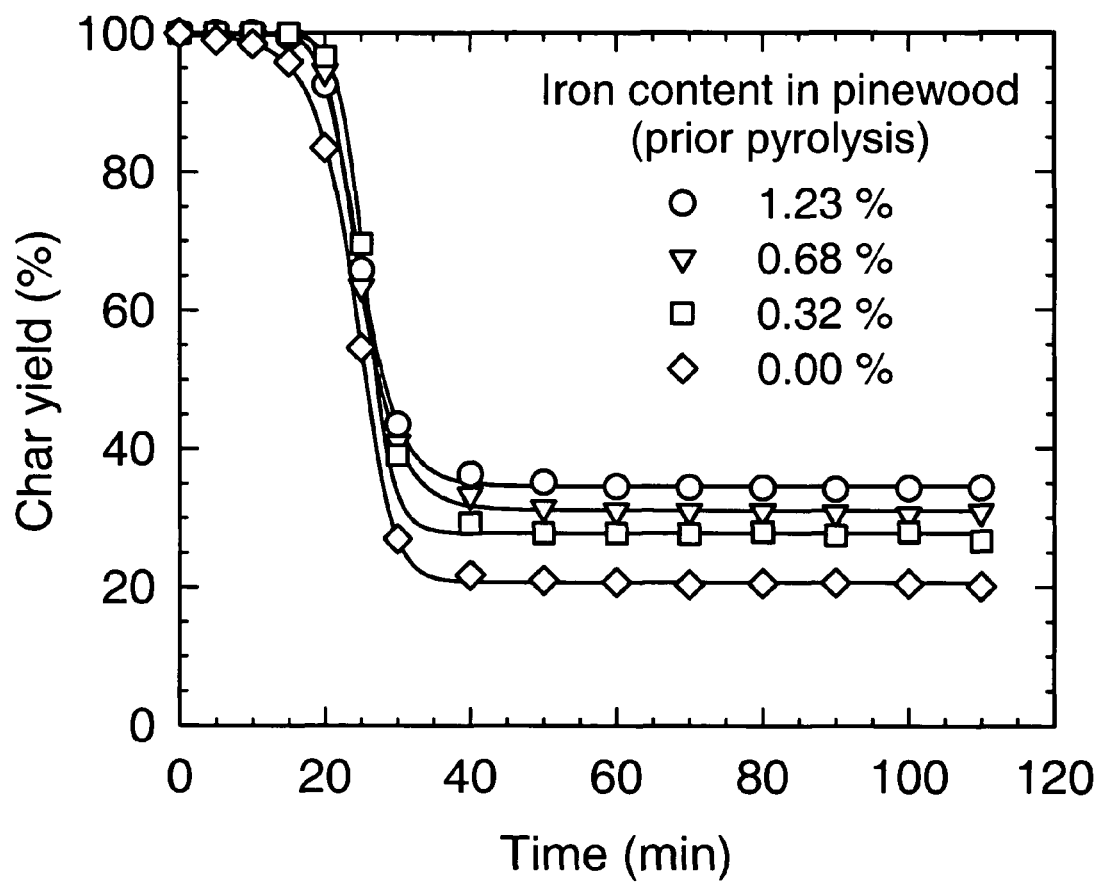
FIG. 2 is a graph showing char yield vs. pyrolysis time for pinewood with different iron contents.

Char is defined as the solid product resulting of a pyrolysis process applied to a carbon-containing material, and char yield is defined as the percentage of char obtained from the dry carbon-containing material. In this particular process, char yield was found to be dependent on the concentration of iron solution used for impregnation, as can be seen on FIG. 2.

Activation:

The char produced was activated using a $CO_2$/$N_2$ atmosphere at 1200° K. The partial pressures of both gases were fixed at 0.42 atm., and flows for both gases were fixed at 1.56 L/min calculated at STP. The char samples were left inside the tube furnace for enough time to produce a weight-loss of 21% to 50%. (burnoff degree). The activated material was then transferred to another tube where it was cooled down to room temperature at a rate of 60° K/min under a fixed $N_2$ flow of 1.56 L/min calculated at STP.

Figure 3:
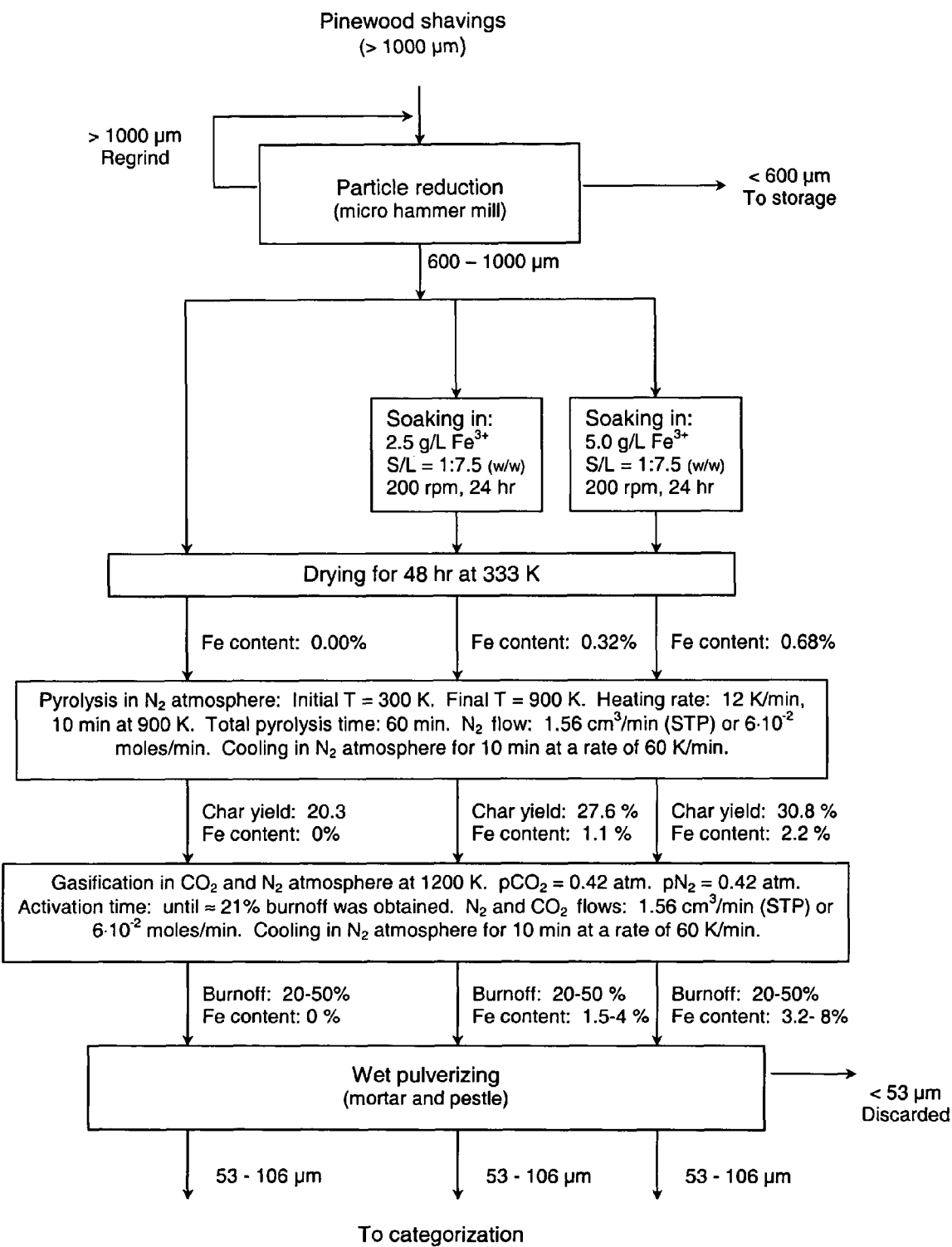
FIG. 3 is a flow sheet showing a method for production of two magnetic activated carbon compositions of the invention and a comparative non-magnetic composition.
Figure 4:
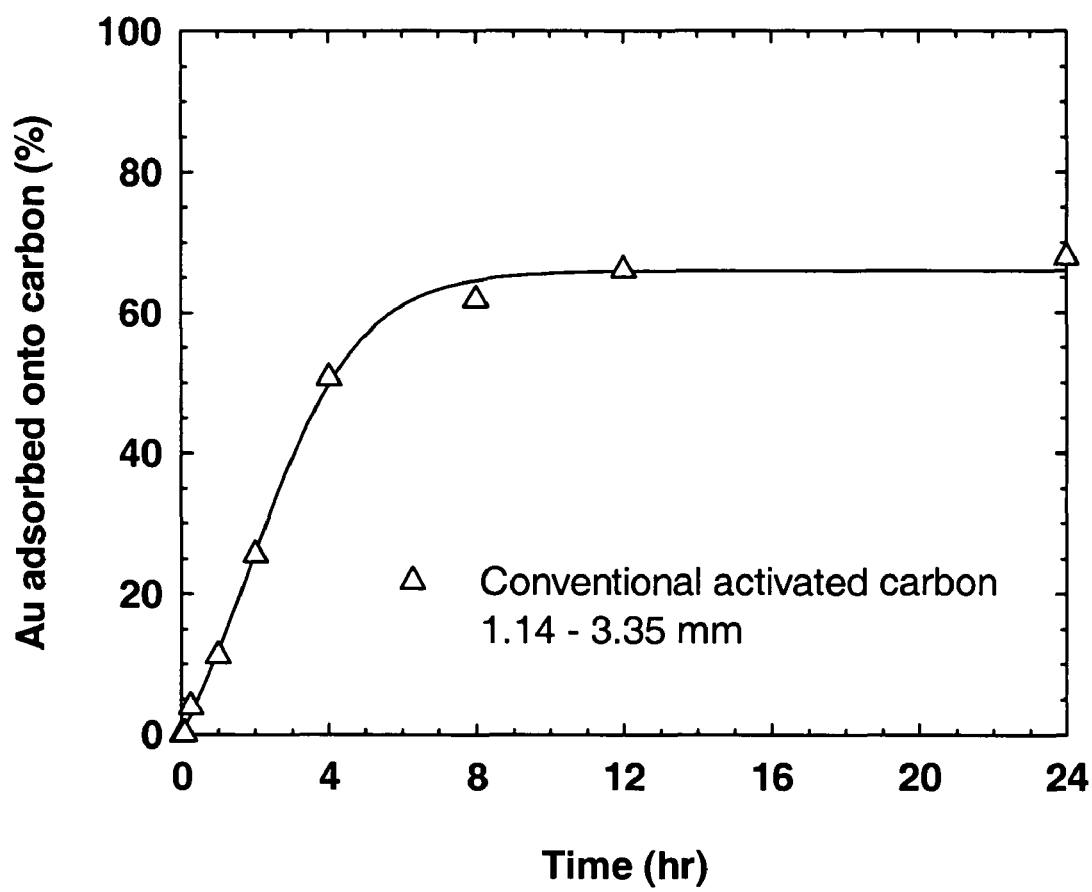
FIG. 4 is a graph showing Au adsorption in conventional activated carbon: 0.100 g of carbon in 100 mL of 0.5 g/L NaCN solution at 200 rpm. Au in solution: 10 mg/L. pH=11.

The magnetic activated carbon (MAC) produced has a particle size of about 300-600 μm. In order to make it powdered, it was wet-ground and sieved, and the particle size between 53-106 μm used for gold recovery analysis and further characterization. FIG. 3 describes the MAC synthesis process.

Au Adsorption Tests:

Dry carbon, 0.100 g, was placed in 100 mL of a solution that contained 0.5 g/L NaCN and 10 mg/L Au at pH 11. The carbon gold-cyanide slurry was placed in a 150-mL plastic bottle, and shaken at 200 rpm for 2 hours. The solution was filtered and the gold content in solution was determined by inductively-coupled plasma emission spectroscopy (ICP).

WHIMS Recovery Tests:

Recovery tests were made using a wet high intensity magnetic separator (WHIMS). A slurry of 0.100 g of carbon in 100 mL of a solution containing 0.5 g/L NaCN at pH 11 was fed to the WHIMS at 1 mL/sec. Steel wool was used as the magnetic matrix. The applied magnetic field corresponds to a current of 3 amps at high intensity.

Gold adsorption from cyanide solution and recovery of MAC using magnetic separation equipment are shown in Table 1.

TABLE 1

Au adsorption and magnetic separation of MAC results.

| Sample | Code | Fe (%) | Burnoff (%) | Au Adsorption % | WHIMS Rec. % |
|---|---|---|---|---|---|
| 1 | P0-1 | 0 | 0 | 4.6 | 0 |
| 2 | P0-2 | 0 | 21 | 50.1 | 0 |
| 3 | P0-3 | 0 | 45 | 89.5 | 0 |
| 4 | P1-1 | 1.1 | 0 | 3.9 | 98.9 |
| 5 | P1-2 | 1.4 | 21 | 55 | 99.7 |
| 6 | P1-3 | 2.7 | 45 | 92.1 | 98.6 |
| 7 | P2-1 | 2.2 | 0 | 5.3 | 98.3 |
| 8 | P2-2 | 2.8 | 21 | 54.1 | 99.4 |
| 9 | P2-3 | 5.6 | 45 | 95.1 | 99.2 |

Under similar adsorption conditions, conventional activated carbon used for gold recovery (Calgon GRC-22 6×12) adsorbs only about 25% of gold in two hours (with a particle size of 1.40-3.35 mm), and this carbon reaches equilibrium at about 12 hours with 70% of gold adsorption.

Figure 5:
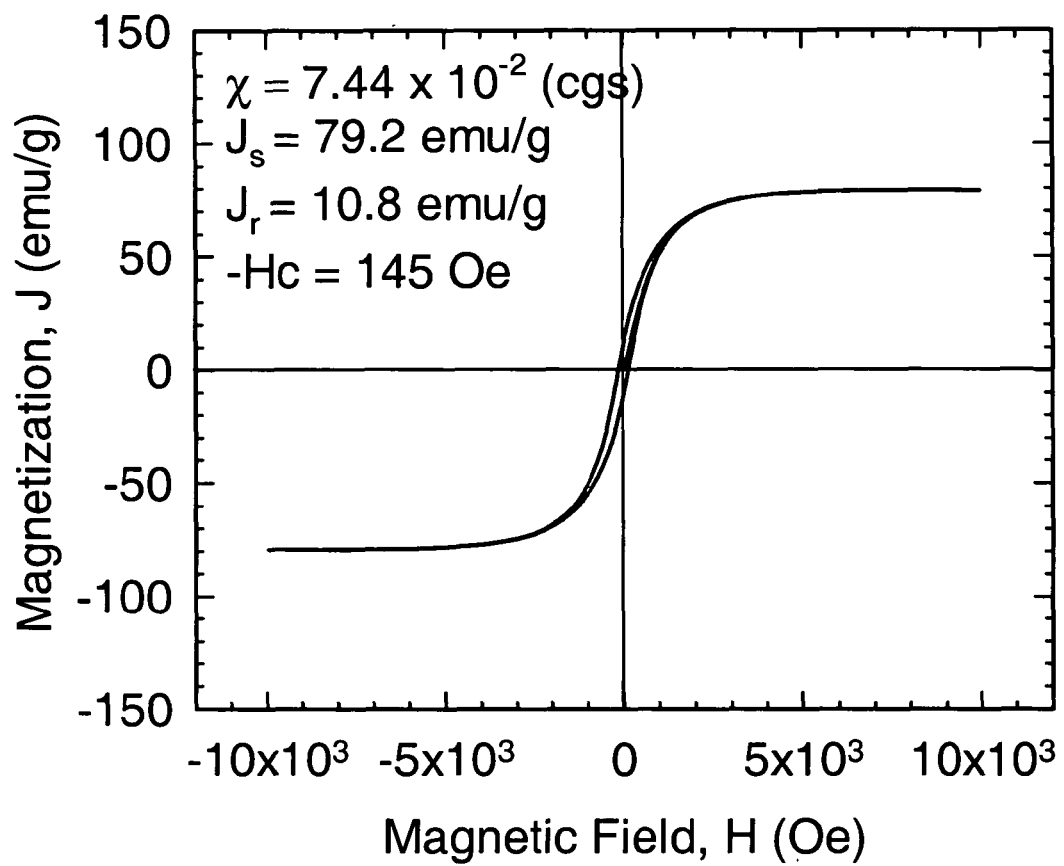
FIG. 5 is a graph showing the magnetization curve of magnetite with a particle size of minus 5 mm.

Magnetization Curves:

FIG. 5 shows the magnetization curve of magnetite. It shows that magnitude has a very high value of initial magnetic susceptibility, and exhibits saturation magnetization (J reaches a maximum value). After the magnetic field H is removed, magnetite shows remanent magnetization. This curve is characteristic of semipermanent or semihard magnets.

Figure 6:
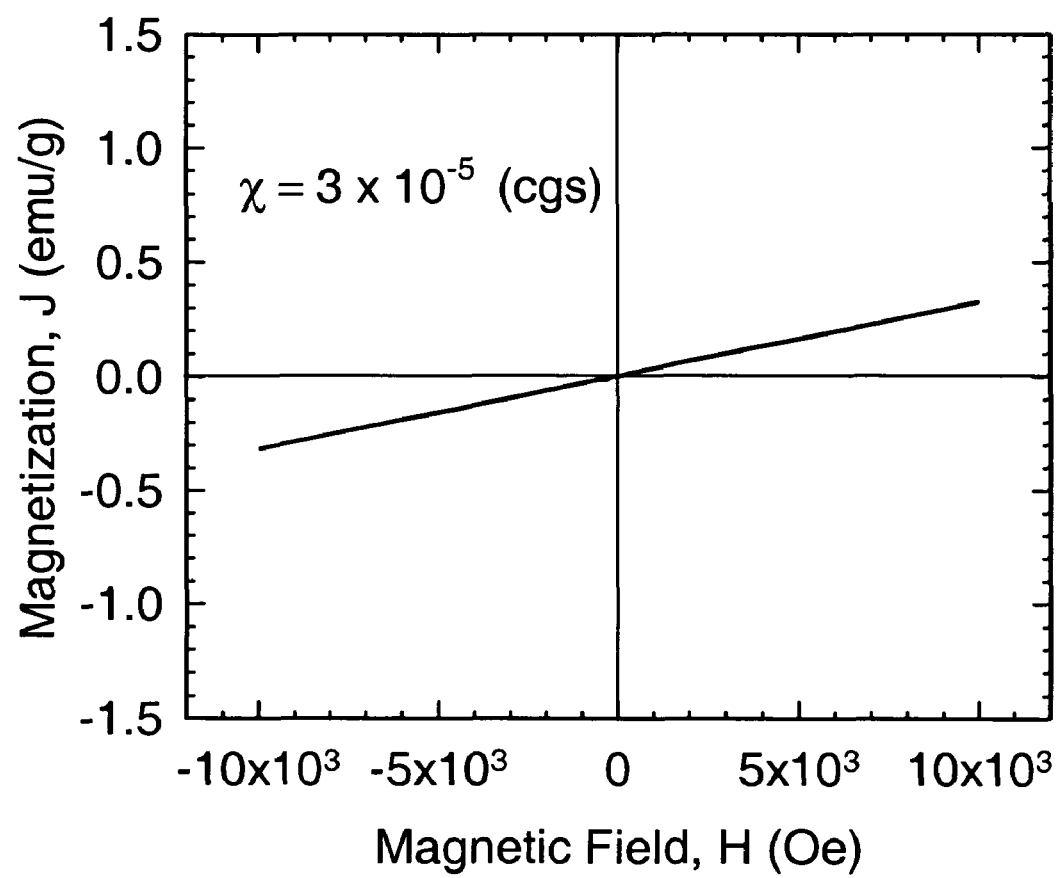
FIG. 6 is a graph showing the magnetization curve of $FeCl_3$ used as a precursor for the preparation of magnetic activated carbon (MAC).

FIG. 6 shows a magnetic curve for $FeCl_3$, used as a precursor for the preparation of MAC. It shows a small value of magnetic susceptibility and does not show hysterisis. This behavior is characteristic of paramagnetic materials.

Figure 7:
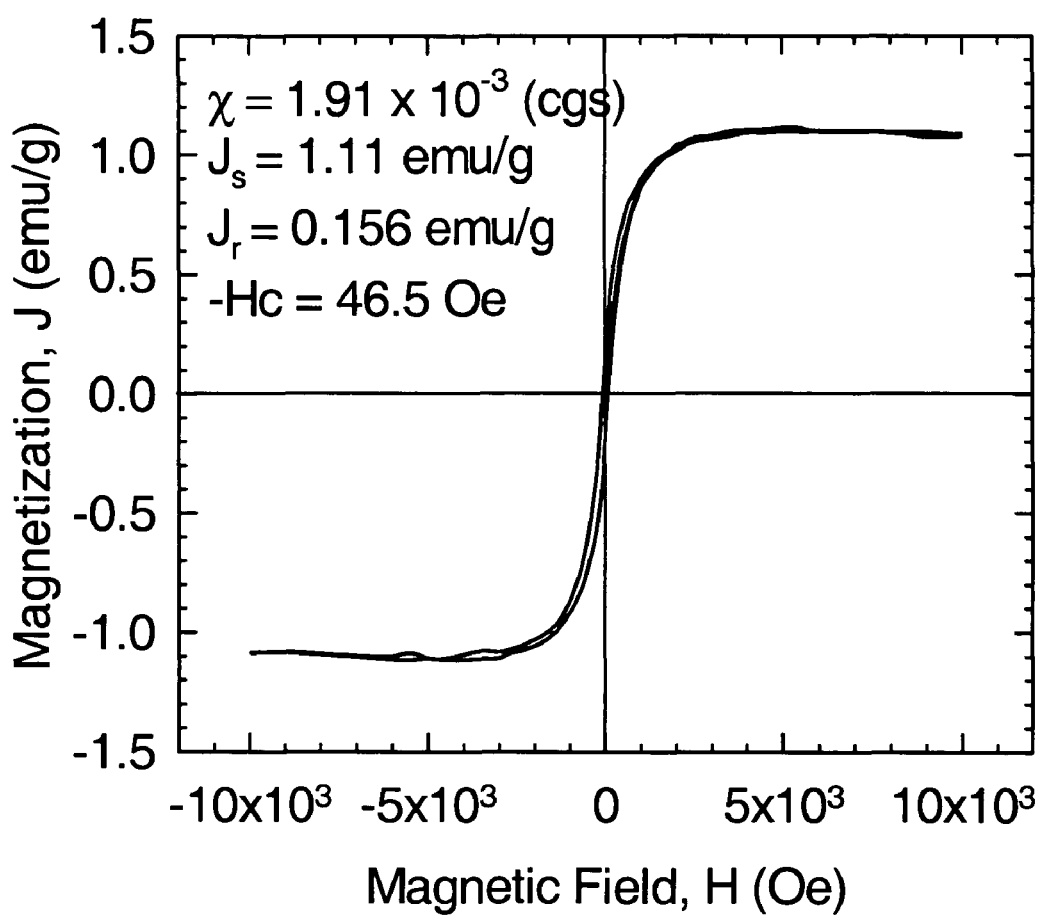
FIG. 7 is a graph showing the magnetization curve of Pinewood MAC with a particle size of 53-106 mm and 2.8% Fe.

FIG. 7 shows magnetization curves of pinewood magnetic activated carbon with 2.8% Fe. It shows hysteresis and has a high value of initial magnetic susceptibility. The plot also shows that it has a low value of remanent magnetization ($J_r$).

Figure 8:
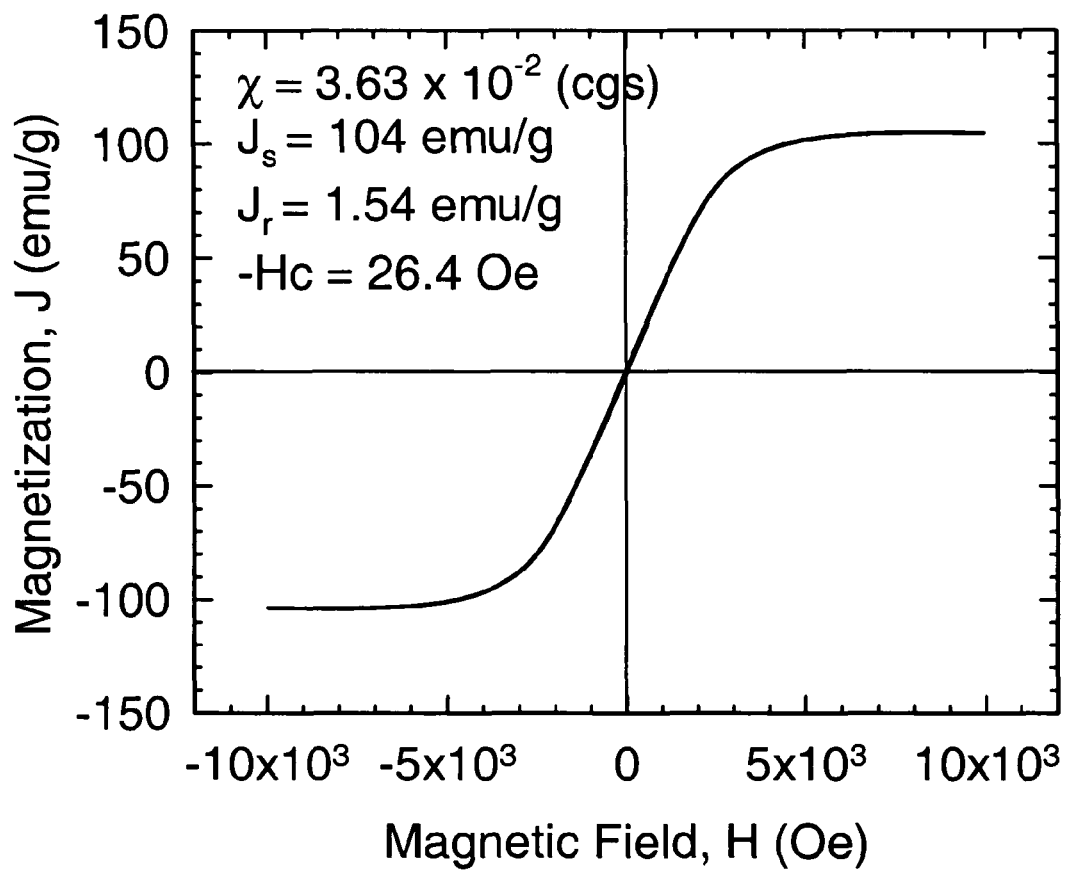
FIG. 8 is a graph showing the magnetization curve of steel wool used as a magnetic matrix.

FIG. 8 shows the magnetization curve for steel wool. It is used in the magnetic separator device as a matrix for magnetic separation. It has high values of initial magnetic susceptibility and saturation magnetization, and it has a low value of remanent magnetization. This behavior is characteristic of non-permanent or soft magnets.

From this point of view, an effective magnetic separation of the magnetic activated carbon using steel wool as the magnetic matrix can be explained. When a magnetic field is applied to the steel wool, it develops a high magnetization that is responsible for the generation of strong forces that are used to retain the magnetic activated carbon in the matrix, and separate it from the slurry. When the magnetic field is removed, both the MAC and the matrix show low values of remanent magnetization (the remaining magnetic forces are significantly small when compared to the forces applied in an effective magnetic separation), and the MAC can be separated from the matrix simply by gravity or with the aid of a water flush.

XRD Analysis

Figure 9:
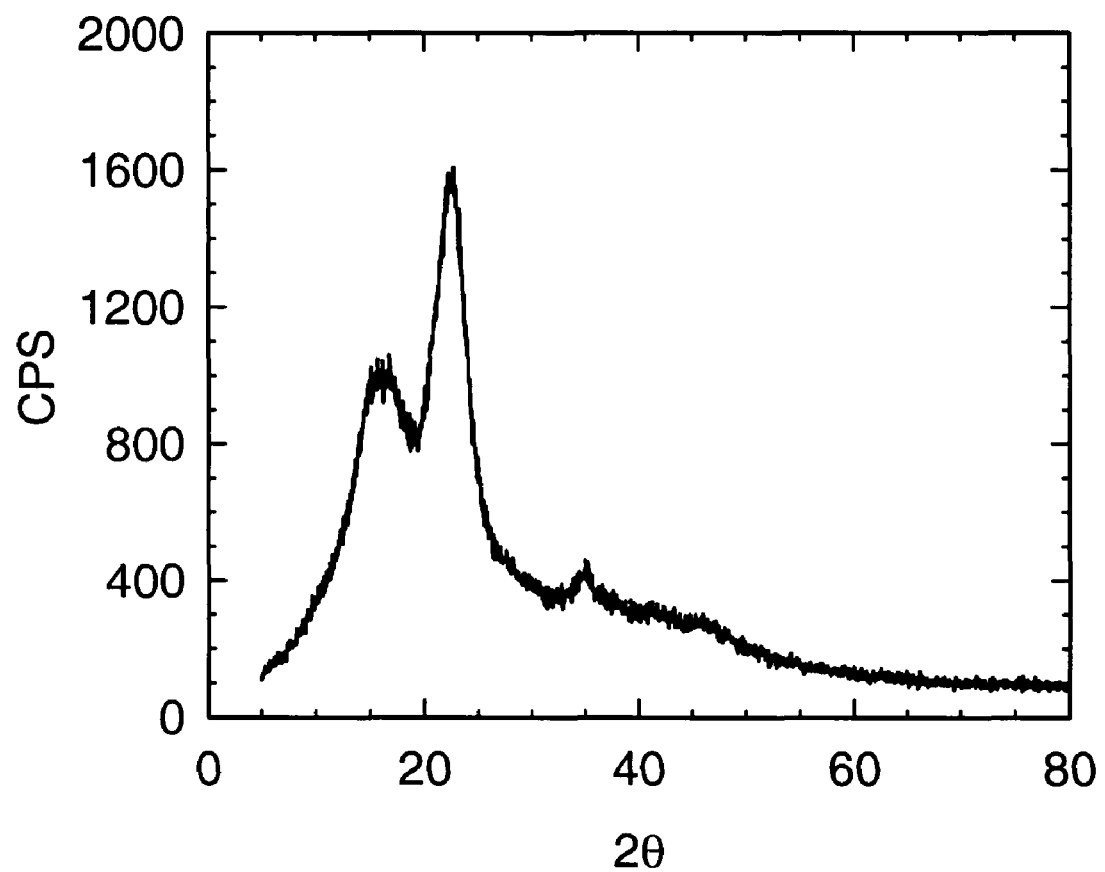
FIG. 9 is a graph showing an XRD scan of pinewood.

FIG. 9 shows an XRD scan of pinewood. The peaks at 2θ values of 15°, 16.5° and 22.8° are characteristic of cellulosic material. The broadness of these peaks is characteristic of amorphous materials or material with short-range order.

Figure 10:
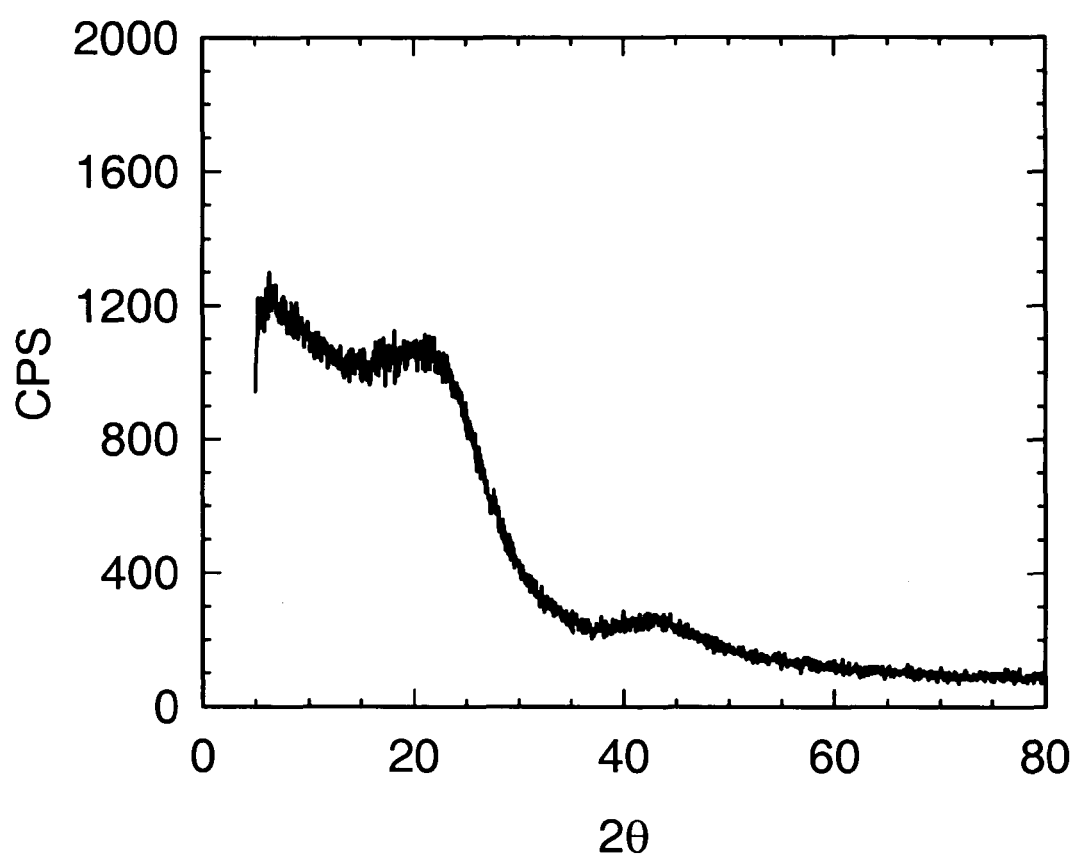
FIG. 10 is a graph showing an XRD scan of char from pinewood. Amount of Fe in char: 0%.

FIG. 10 shows an XRD scan of char obtained from pinewood with no iron impregnation. The broad region in the 2θ region of 5°-35° is characteristic of the highly amorphous nature of the char.

Figure 11:
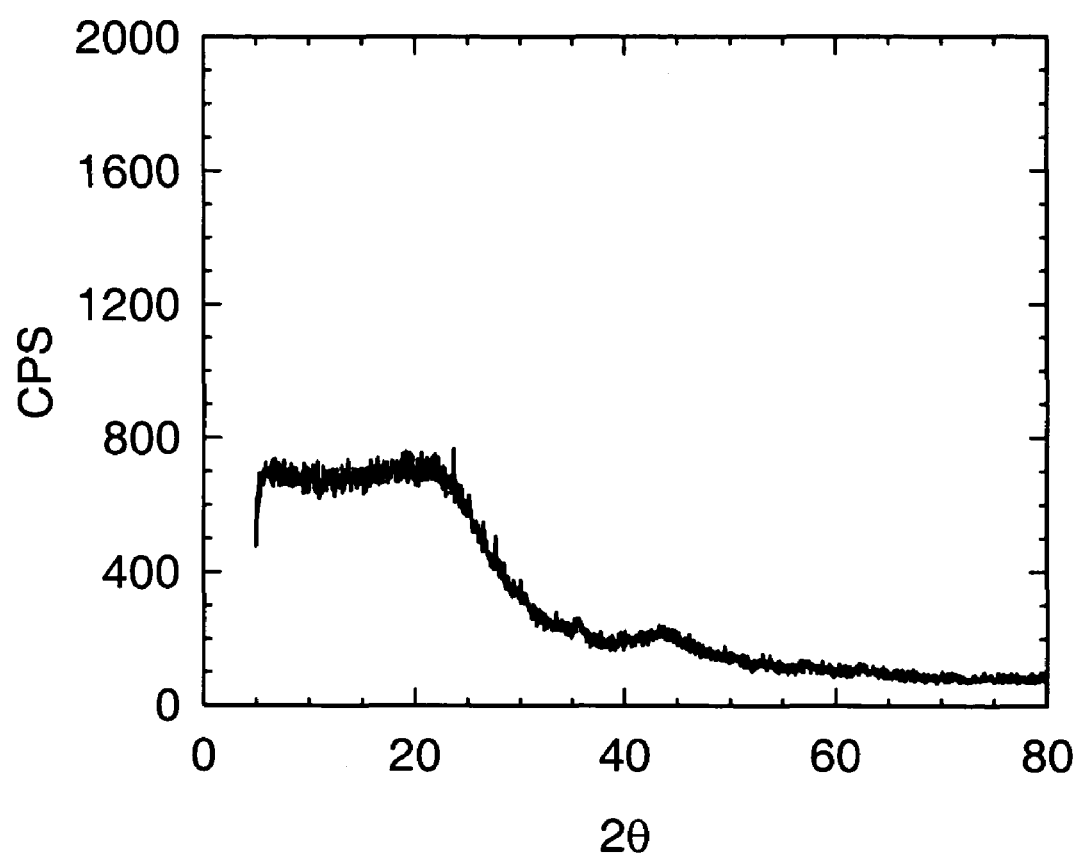
FIG. 11 is a graph showing an XRD scan of char from pinewood. Amount of Fe in char: 1.1%.
Figure 12:
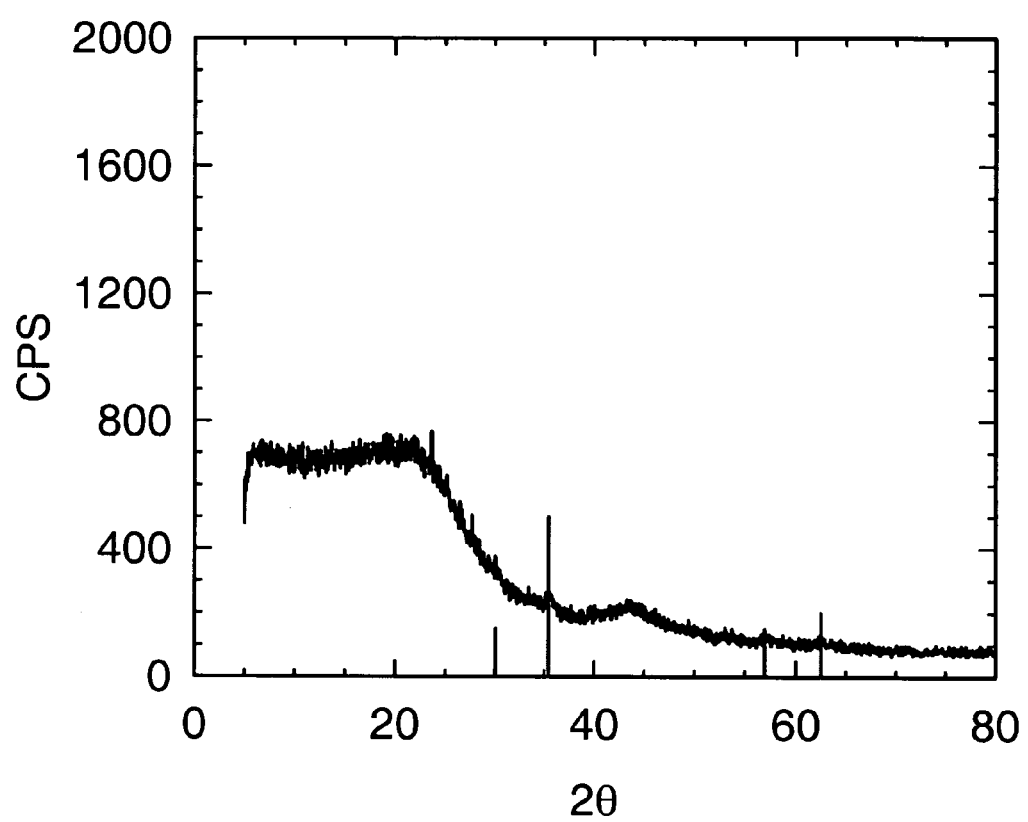
FIG. 12 is a graph showing an XRD scan of char from pinewood with the magnetite XRD spectra overlapped. Amount of Fe in char: 1.1%.

FIG. 11 is an XRD scan of a char from pinewood. The amount of Fe in the char is 1.1%. The highly disorganized structure, characteristic of amorphous materials is evidenced in the broad peak region between the 2θ values of 5° to 30°. At 2θ values of 30.1°, 35.4°, 56.94°, and 62.51°, the peaks that correspond to magnetite are present. This can be visualized overlapping the magnetite XRD pattern as it is shown in FIG. 12.

Figure 13:
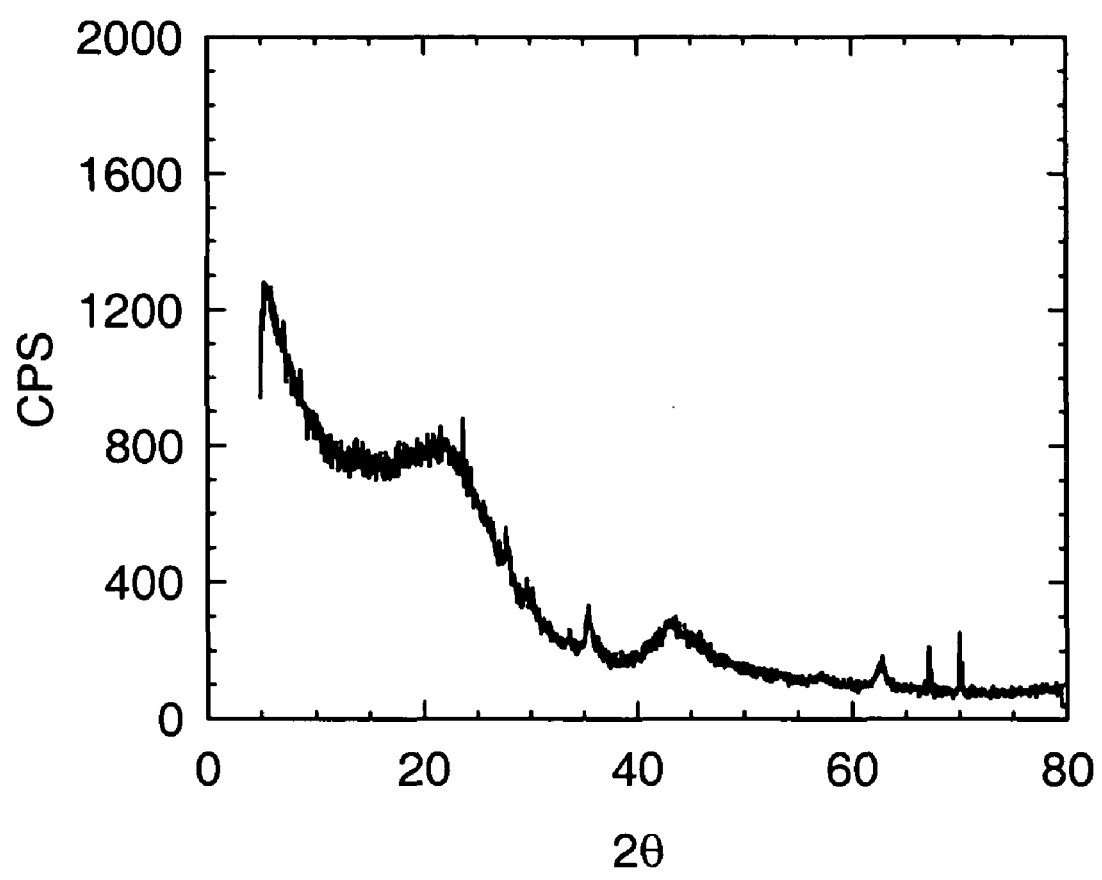
FIG. 13 is a graph showing an XRD scan of MAC from pinewood. Amount of Fe in MAC: 1.4%.
Figure 14:
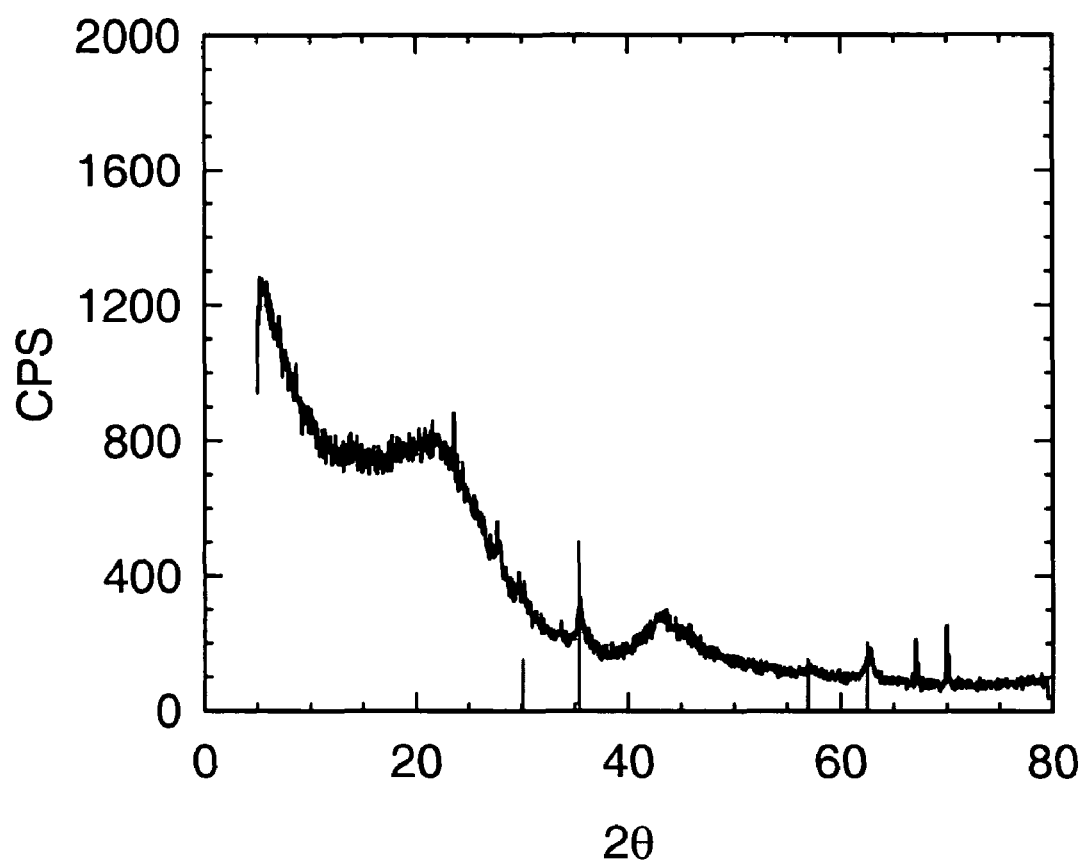
FIG. 14 is a graph showing an XRD scan of MAC from pinewood with the magnetite XRD spectra overlapped. Amount of Fe in MAC: 1.4%.

FIG. 13 is an XRD scan of MAC from pinewood. The amount of Fe in MAC is 1.4%. The highly disorganized structure, characteristic of amorphous materials is evidenced in the broad peak region between the 2θ values of 5° to 30°. At 2θ values of 30.1°, 35.4°, 56.94°, and 62.51°, the peaks that correspond to magnetite are present. This can be visualized overlapping the magnetite XRD pattern as it is shown in FIG. 14.

Economical Considerations for Gold Recovery

Figure 15:
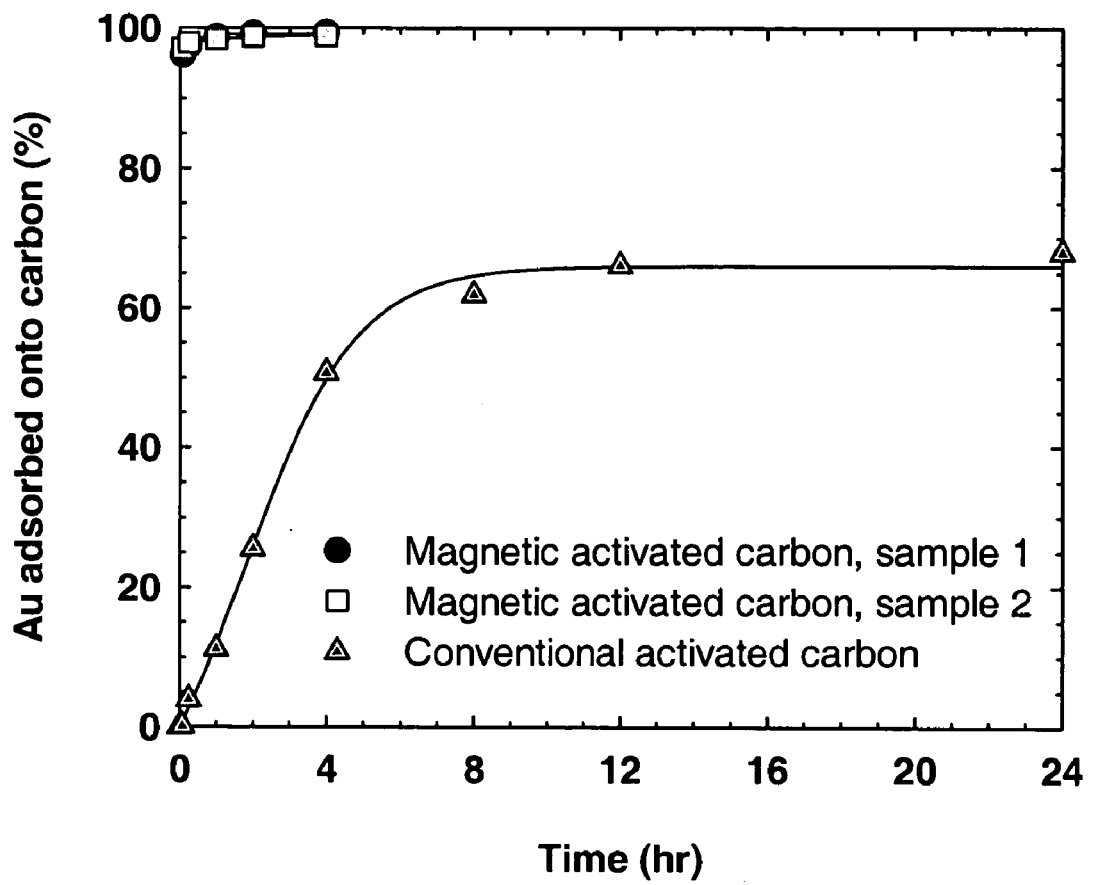
FIG. 15 is a graph showing gold adsorption onto two different samples of powdered magnetic activated carbon with a particle size of minus 74 μm and on a conventional activated carbon. Adsorption conditions: 10 mg/L Au, 1 g/L NaCN, 1 g/L activated carbon, pH 11, 23° C., 200 rpm.
Figure 16:
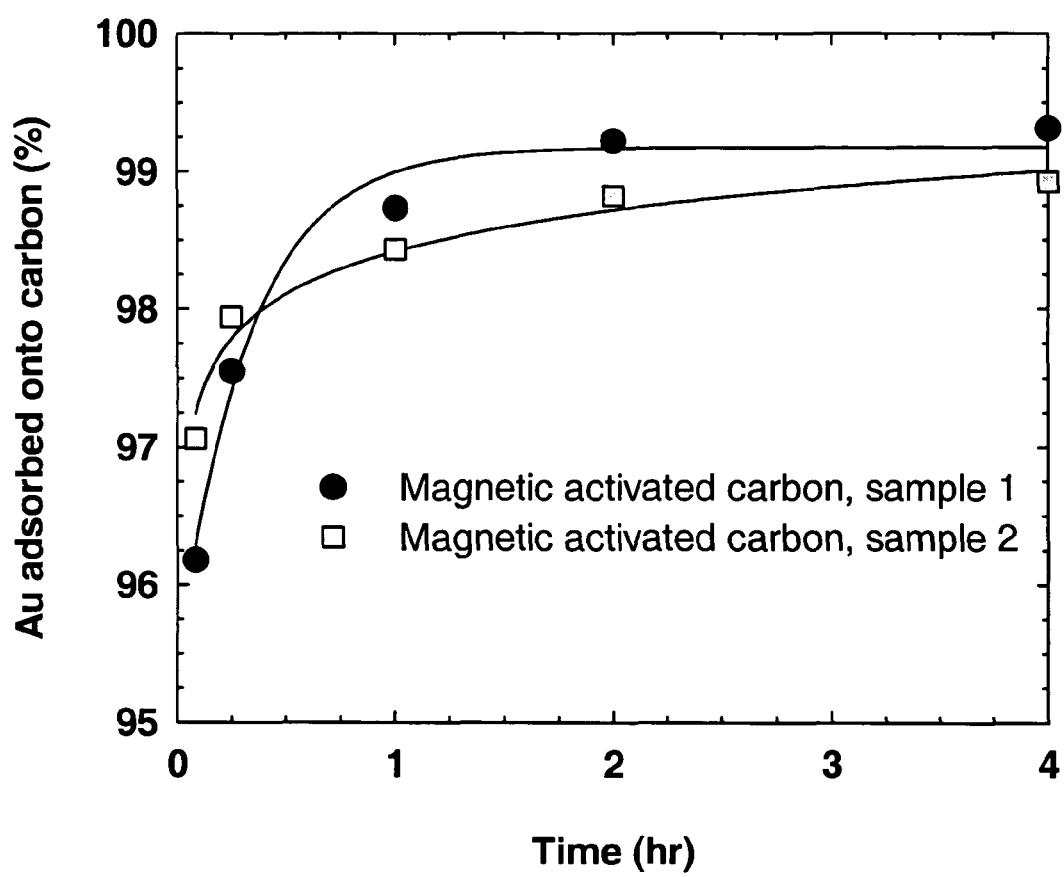
FIG. 16 is a graph, which is a magnification of the left-top corner of the graph shown in FIG. 15.

FIGS. 15 and 16 show that the use of powdered magnetic activated carbon for gold recovery from cyanide solutions increases significantly the loading kinetics from solution in the gold recovery process and is expected to provide significant savings in equipment and operating costs. Separation of this loaded carbon from the pulp magnetically, rather than by screening of granular carbon, should offer significant capital and operating cost savings.

Figure 17:
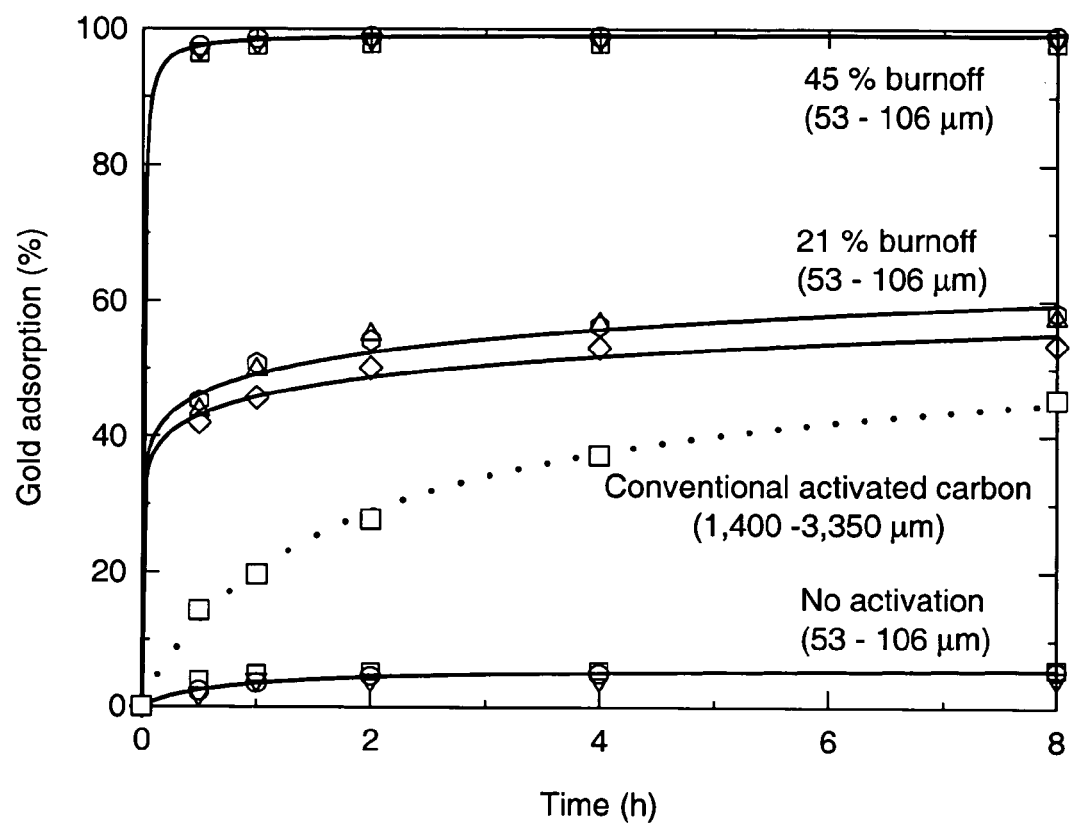
FIG. 17 is a graph showing the effect of burnoff degree and iron content of the different chars.

FIG. 17 shows the effect of burnoff degree and iron content of the different chars produced from pinewood and ferric chloride for a particle size range of 53-106 µm on gold adsorption kinetics. The first group, at no activation, shows a carbon with no iron and two magnetic carbons with different iron contents. The three samples show the same trend with respect to gold adsorption kinetics. The second group, at a burnoff degree of 21%, shows an activated carbon with no iron and two magnetic activated carbons with different iron contents. The three samples show the same trend with respect to gold adsorption kinetics. The third group, at a burnoff degree of 45%, shows an activated carbon with no iron and two magnetic activated carbons with different iron contents. The three samples show the same trend with respect to gold adsorption kinetics. Results for a conventional activated carbon with a particle size of 1,400-3,350 µm is included for comparison. Adsorption conditions: 1 g/L activated carbon, 10 mg/L Au, 0.01 M NaCN, pH 11, 200 rpm, 298° K.

It has been estimated, on a preliminary basis, that reductions in the capital cost of the recovery portion of a gold plant of 10%, or more, are possible and that the operating costs could be significantly reduced using the magnetic activated carbon, assuming that the proposed research successfully resolves a number of key concerns. A preliminary evaluation done by an engineering and construction company involved in the design and construction of gold recovery circuits indicates that this cost advantage is sufficient to cause companies planning new project construction to seriously consider the magnetic activated carbon process; and those which currently operate plants to evaluate conversion of the traditional activated carbon process to this new process based on magnetic activated carbon.

Alternate Synthesis Procedure for Magnetic Activated Carbons

Powdered magnetic activated carbons for gold recovery have been produced using two different raw materials and one magnetic precursor. The carbons produced have enough magnetic content to be recovered with a magnetic separator. The particle size of the MACs is in the range of 150-600 µm. As carbon sources, pinewood dust with a particle size of 250-600 µm, and cornstarch, with a particle size of minus 25 µm have been used. These two products were chosen because they have different behaviors during the pyrolysis stage, and because the incorporation of the magnetic source into the carbon structure is also done in different manner. The magnetic precursor chosen for this research was ferric citrate tetrahydrate ($C_6H_5O_7Fe \cdot 4H_2O$). An organic iron salt was chosen over inorganic salts, such as iron chlorides, nitrates or sulfates, to avoid the generation of species, such as $Cl_2$, dioxins, $NO_x$, $SO_2$, and other compounds during synthesis.

Synthesis of MACs

Preparation of cornstarch—iron citrate mixture. A specific amount of cornstarch was mechanically mixed with a specific amount of iron citrate, both as dry powders.

Preparation of pinewood—iron citrate mixture. A pinewood board, without the bark, was processed in a sawmill until it was reduced to shavings and dust. The shavings were further processed using a Gilson® micro-hammer cutter-mill, and the size fraction 250-600 µm obtained from both the dust and the milled shavings was selected. A specific amount of iron citrate was added to water, and the mixture was heated until complete dissolution of the iron salt (iron citrate is slightly soluble in cold water, but it dissolves readily in hot water). After complete dissolution of the iron salt, a specific amount of the pinewood dust of the selected particle size was added to the iron citrate solution. The pulp was placed in a Nalgene® HDPE bottle, covered with a lid, and agitated using a VWR® orbital shaker at 200 rpm for 24 hours. Afterwards, the pulp was transferred to a vacuum filter, and the remaining pinewood impregnated with iron citrate was dried in a Blue M® oven at 400° K for 12 hours.

Pyrolysis experiments. All pyrolysis experiments were done using a Thermoline® 10500 furnace preheated at 900° K and permanently purged with $N_2$ at a flowrate of 1.56 L/min, measured at 273° K and 1 atm. The mixtures to be pyrolyzed were placed in a 100-mL Coors® clay crucible covered with a lid. The mixtures were pyrolyzed for 45 minutes in the case of the cornstarch—iron citrate mixtures, and for 30 minutes for the pinewood—iron citrate mixtures. After pyrolysis was complete, the crucibles were transferred to a dissecator where samples were cooled to room temperature under vacuum.

In the case of the carbon obtained from the cornstarch—iron citrate mixtures, these were ground in a Brinkmann-Retsch® automatic mortar and pestle to obtain the desired particle size. In the case of the carbon obtained from the pinewood—iron citrate mixture, the product was wet screened, and a defined size fraction was selected for activation.

Gasification experiments. All gasification experiments were done using a Lindberg® 3-chamber tube furnace preheated at 1200° K. For each carbon produced previously, two different gases were used for activation. One set of experiments was done using $H_2O$ as the activating agent, and another set of experiments was done using $CO_2$ as the activating agent. For both gasification agents the gas flowrate was kept constant at 700 mL/min (measured at 273° K and 1 atm). Activation time was varied to obtain activated carbons from 10% to 50% burnoff. The sample to be activated was placed in a clay crucible, forming a monoparticle bed. After gasification, the crucible was transferred to an alumina tube, where the samples were cooled to room temperature under a $N_2$ atmosphere at a flowrate of 1.56 L/min, measured at 273° K and 1 atm.

Heat treatment of the MACs. Selected samples of magnetic activated carbons produced as described previously were heat-treated to alter the adsorption characteristics of the carbon surface. A heat treatment in $N_2$ atmosphere at 1200° K and a heat treatment in an $O_2$ atmosphere at 700° K were used.

Figure 18:
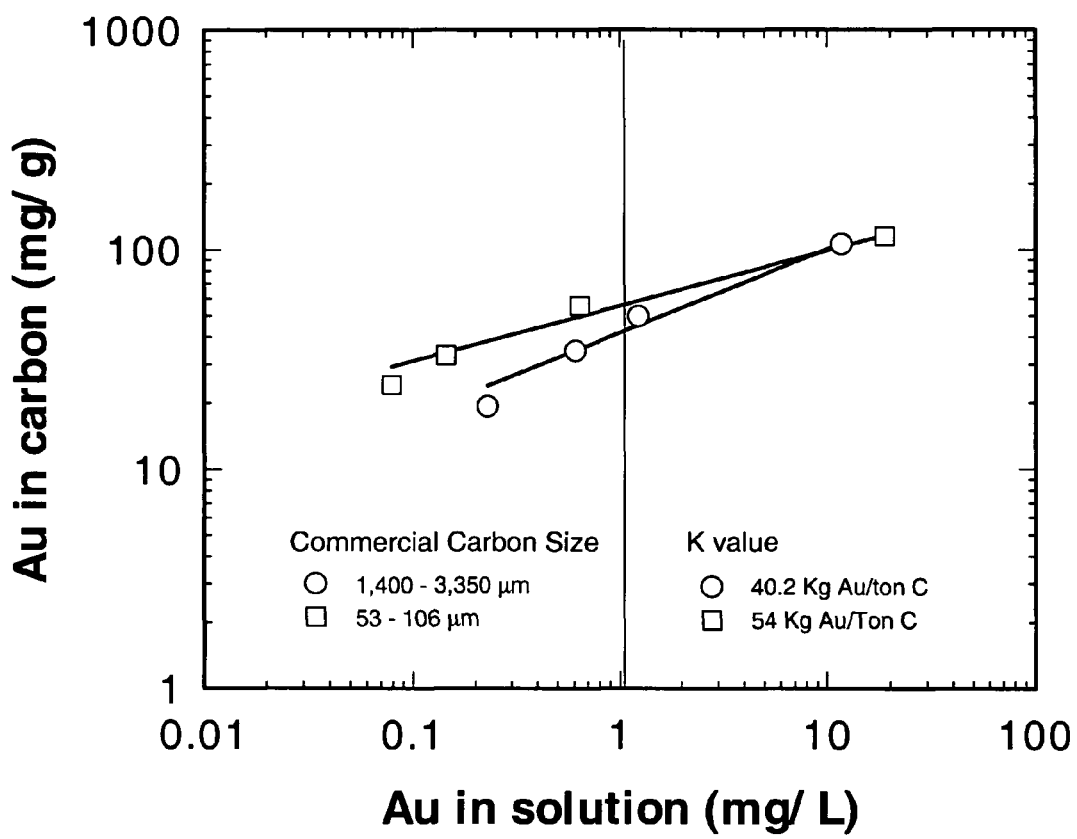
FIG. 18 is a graph showing the loading capacity of a conventional activated carbon used for gold recovery.

FIG. 18 shows the loading capacity of a conventional activated carbon used for gold recovery. At its original size 1,400-3,350 µm, it has a loading capacity (K value) of 40.2 Kg of gold per metric ton of activated carbon. When the carbon is ground to a particle size of 53-106 µm, its loading capacity (K value) increases to 54 Kg of gold per metric ton of activated carbon. The loading capacity K is defined as the amount of gold per metric ton of carbon that is in equilibrium with a solution containing 1 milligram of Au per liter of solution, starting with an initial solution containing 100 milligrams of Au per liter of solution. Adsorption conditions, 1-5 grams of carbon per liter of solution, 100 mg/L Au, 200 rpm, 296 K, pH 11.

Figure 19:
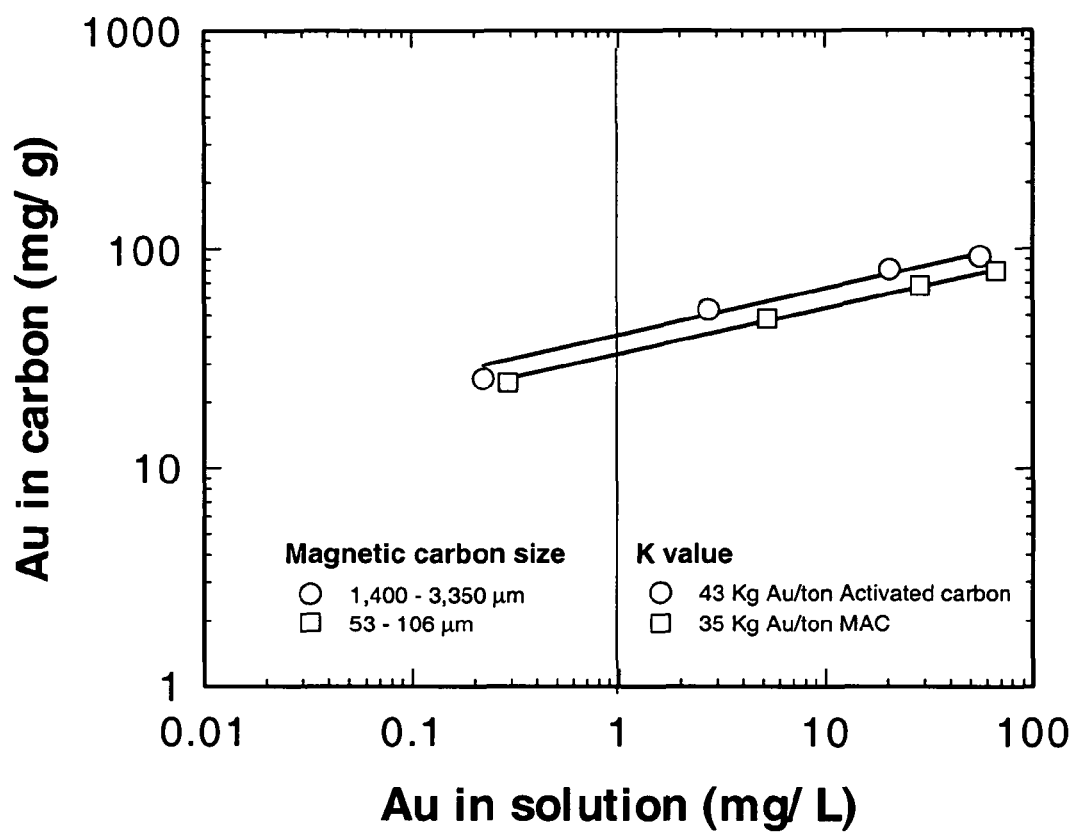
FIG. 19 is a graph showing the loading capacity of an activated carbon and a magnetic activated carbon.

FIG. 19 shows the loading capacity of an activated carbon and a magnetic activated carbon produced with pinewood and ferric citrate, with a particle size of size 250-600 µm. Loading capacities (K values) are 43 and 35 Kg Au/ton carbon, respectively. It can be seen that the K values are in the same magnitude as conventional activated carbon used for gold recovery (compare to FIG. 18).

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

What is claimed is:

1. An activated carbon particle comprising magnetic material that impregnates, and is intimately mixed and dispersed within activated carbon material at a molecular level to impart sufficient magnetic property of the particle to allow magnetic separation of the particle from a liquid, said activated carbon particle produced by:
   forming an intimate mixture of a magnetic material precursor and a carbon precursor;
   drying and pyrolizing the intimate mixture to form carbon of the carbon precursor and the magnetic material of the magnetic material precursor such that the carbon and the magnetic material are intimately mixed at the molecular level; and
   activating the carbon to form the activated carbon particle.

2. An activated carbon particle as in claim 1 having a particle size between 53 µm and 106 µm.

3. An activated carbon particle as in claim 1 having a particle size between about 50 µm and 600 µm.

4. An activated carbon particle as in claim 1 wherein the activated carbon particle is magnetically soft.

5. An activated carbon particle as in claim 1 wherein the activated carbon particle does not exhibit magnetic hysterisis.

6. An activated carbon particle as in claim 1 wherein the activated carbon material is formed from an agricultural porous material, a water soluble carbohydrate or a plastic.

7. An activated carbon particle as in claim 1 wherein the magnetic material is ferric iron, ferrous iron, or elemental iron.

8. A method of treating waste water comprising contacting water containing material to be removed that is capable of being adsorbed upon activated carbon that comprises mixing the water with an activated carbon particle as in claim 1 to adsorb the material to be removed upon the activated carbon, and subjecting the mixture of water and the activated carbon to a magnetic field under conditions to magnetize the activated carbon and remove the activated carbon from the water.

9. A method as in claim 8 wherein the activated carbon has a particle size less than about 600 µm.

10. A method as in claim 8 wherein the material to be removed includes organic compounds and the organic compounds are absorbed upon the activated carbon.

11. A method as in claim 8 wherein the material to be removed includes heavy metals and the heavy metals are absorbed upon the activated carbon.

12. A method for producing an activated carbon material with magnetic properties comprising; integrating together a solution of a magnetic material precursor and a carbon precursor to form an intimate mixture, drying and pyrolizing the mixture to transform the carbon precursor into carbon, activating the carbon to form a solid composition of activated carbon and magnetic material derived from the magnetic material precursor such that the magnetic material impregnates, and is intimately mixed and dispersed within the activated carbon material at a molecular level to impart sufficient magnetic property of the particle to allow magnetic separation of the particle from a liquid, the magnetic material precursor being an iron containing material that forms an intimate mixture with the carbon precursor, the carbon precursor being a material that is pyrolizable into carbon that is capable of being activated for adsorption.

13. A method as in claim 12 wherein the integrating is accomplished by providing a water soluble magnetic material precursor, dissolving the water soluble magnetic material precursor into an aqueous solution, providing carbon precursor that is sufficiently porous to absorb the solution of the magnetic material precursor, and soaking the carbon precursor in the solution.

14. A method as in claim 12 wherein the integrating is accomplished by providing a carbon precursor that can be melted together with the magnetic material precursor to form a homogeneous melted mixture.

15. A method as in claim 12 wherein the integrating is accomplished by providing a carbon precursor and magnetic material precursor that are water-soluble and are dissolving same into a homogeneous solution of the magnetic precursor, and the carbon precursor.

16. A method as in claim 12 wherein the iron containing material comprises one or more of ferric iron, elemental iron, or ferrous iron.

17. A method for recovering gold cyanide complexes from solution comprising mixing an aqueous solution containing gold cyanide complexes with an activated carbon particle as in claim 1 to adsorb the gold cyanide complexes upon the activated carbon, and subjecting the mixture of solution and the activated carbon to a magnetic field under conditions to magnetize the activated carbon and remove the activated carbon from the solution.

18. A method as in claim 17 wherein the activated carbon has a particle size less than about 600 μm.

19. A method for recovering dissolved precious metals from solution comprising mixing an aqueous solution containing the precious metal in solution with an activated carbon particle as in claim 1 to adsorb the precious metal upon the activated carbon, and subjecting the mixture of solution and the activated carbon to a magnetic field under conditions to magnetize the activated carbon and remove the activated carbon from the solution.

20. A method as in claim 19 wherein the activated carbon has a particle size less than about 600 μm.

\* \* \* \* \*